(12) United States Patent
Bozkurt et al.

(10) Patent No.: US 11,685,600 B2
(45) Date of Patent: Jun. 27, 2023

(54) OPTIMIZATION AND AUTOMATISATION MODEL FOR AUTOMOTIVE TIRE STORING

(71) Applicants: Ugur Bozkurt, Malatya (AR); Mehmet Altuğ, Malatya (AR)

(72) Inventors: Ugur Bozkurt, Malatya (AR); Mehmet Altuğ, Malatya (AR)

( * ) Notice: Subject to any disclaimer, the term of this patent is extended or adjusted under 35 U.S.C. 154(b) by 308 days.

(21) Appl. No.: 16/632,348

(22) PCT Filed: Nov. 1, 2017

(86) PCT No.: PCT/TR2017/050542
§ 371 (c)(1),
(2) Date: Jan. 18, 2020

(87) PCT Pub. No.: WO2019/088943
PCT Pub. Date: May 9, 2019

(65) Prior Publication Data
US 2020/0255220 A1   Aug. 13, 2020

(51) Int. Cl.
| G06F 7/00 | (2006.01) |
| B65G 1/08 | (2006.01) |
| A47F 7/04 | (2006.01) |
| B65G 47/46 | (2006.01) |
| G06Q 10/087 | (2023.01) |
| H04N 7/18 | (2006.01) |

(52) U.S. Cl.
CPC .................. *B65G 1/08* (2013.01); *A47F 7/04* (2013.01); *B65G 47/46* (2013.01); *G06Q 10/087* (2013.01); *H04N 7/18* (2013.01); *B65G 2201/0273* (2013.01); *B65G 2203/041* (2013.01); *B65G 2203/042* (2013.01)

(58) Field of Classification Search
CPC .. B65G 1/08; B65G 47/46; B65G 2201/0273; B65G 2203/041; B65G 2203/042; A47F 7/04; G06Q 10/087; H04N 7/18
USPC .................................. 414/289; 700/213–216
See application file for complete search history.

(56) References Cited

U.S. PATENT DOCUMENTS

| 6,298,999 | B1 | 10/2001 | Belman | |
| 9,710,783 | B1 | 7/2017 | Thomas | |
| 2012/0027558 | A1 | 2/2012 | Weeden et al. | |
| 2014/0197012 | A1* | 7/2014 | Miller | B65G 1/04 198/469.1 |
| 2015/0239669 | A1* | 8/2015 | Miller | B65G 23/04 209/583 |

FOREIGN PATENT DOCUMENTS

| EP | 2088097 | 8/2009 |
| TR | 201113046 | 3/2012 |
| WO | 2006028644 | 3/2006 |

* cited by examiner

*Primary Examiner* — Yolanda R Cumbess
(74) *Attorney, Agent, or Firm* — Crose Law LLC; Bradley D. Crose

(57) ABSTRACT

The invention relates to automotive tire storing system (100) providing storage of the tires (200) used in automotive sector and building a storage-controlling automatization. The invention particularly relates to automotive tire storing system (100) providing automatically detecting diameter of the tires (200), placing the tire at an appropriate position according to the detected diameter, firstly taking the tire stored in the first place thereout.

3 Claims, 8 Drawing Sheets

OPTIMIZATION AND AUTOMATISATION MODEL FOR AUTOMOTIVE TIRE STORING

THE TECHNICAL FIELD TO WHICH THE INVENTION IS RELATED

The invention relates to automotive tire storing system providing storage of the tires used in the automotive sector and building a storage-controlling automatization.

The invention particularly relates to an automotive tire storing system that can automatically detect the diameter of the tires and can place the tires at an appropriate position based on the detected diameter.

STATE OF THE ART

Massive progress has been made in rubber tires for vehicles after invention and becoming widespread of cars. Tires fulfill functions and criterions such as carrying a stationary car, resisting against massive weight transfers resulting during acceleration and brake situations, transferring engine power to the road during braking and cornering, securely steering vehicle according to road and climate conditions and decreasing roughness on road. According to need of user, various tire types are produced. Because of difference in priorities of every user and seasonal changes and/or wear, users have to change the tires in certain periods. Therefore, tire producers and sale firms have to store and stock tires having different characteristics and being in different diameters.

Patent document numbered "TR 2011/13046" has been examined in the result of preliminary research about state of the art. It has been stated in the abstract of the invention subjected to the application that "the invention relates to a block rack for storing the car tires in form of stocked, wherein said rack comprises more than one rack combined with more than one travers and thereby forming divisions and comprising vertical longitudinal poles and being in a spaced relation to each other in longitudinal sides and ramp base plates are arranged for car tires in the rack divisions. The block rack is comprised of at least such four racks arranged successively, wherein ramp base plates extending to front rack from rear rack (S) or extending the other frontal side from one frontal side of every rack are arranged for each car tires and said tires are stored perpendicularly successively in the block rack being interactive in movement surfaces. Regarding width of car tires, if necessary, several side tire holding element can be connected to transverse traverses of the racks so as to avoid accidents. Car tires roll frontward towards front rack over ramp base plates of the racks by means of preferable appropriate clawed-handling apparatus and then can be taken out of frond rack".

Patent document numbered "US2012027558" has been examined in the result of preliminary research about state of the art. The invention subjected to the application describes a tire storing system comprising a rack structure defining how to perpendicularly place tires in racks.

Patent document numbered "U.S. Pat. No. 6,298,999" has been examined in the result of preliminary research about state of the art. The invention subjected to the application describes tire stocking system having a rack mounted on a pallet and a frame so as to horizontally store tires by overlapping.

There is already not a professional model for stocking any kind of automotive tires, though various stocking methods do exist. However, in those stocking models, as the stocking record is carried out manually, various problem may occur. Furthermore, since tires are bigger in terms of its dimension and size, they take up too much space. The most important one of those problems is space shortage and unable to firstly take out the tire stocked in the first place. In order to firstly take out the tire stocked in the first place, the tires stocked subsequently should be also re-arranged. Therefore, the tires of which useful life is expired in the stocks constitute a big problem. Furthermore, occupational accidents may occur depending on the high workforce needed and the stacking of tires of the heavy vehicles.

Deformations may occur on cord tires depending on crushing on sidewalls of the tires stocked horizontally. Blowouts may occur while said tires are being mounted to the vehicles, in case those deformations stay for a long time. Furthermore, a certain amount of height of storehouse can be yet used in horizontally stocking. In order to make use of absolute height, vehicles like forklifts etc. must be exploited.

As a result, due to the aforementioned drawbacks and insufficiency of the existing solutions regarding the subject matter, the need for a development in the related technical field has arisen.

OBJECTIVE OF THE INVENTION

The main objective of the invention is to provide that car tires taking too much space because of their dimension and size, take up lesser space in the racks by means of the stocking method.

Another important objective of the invention is to provide that tires are automatically detected according to their dimensions and tires stocked in the first place can be firstly taken out of stocking system by automatically moving on the sloped racks. Thereby, it is provided to exploit tires in its useful life time.

Another objective of the invention is to provide advantage in carrying and transferring by moving on the racks by means of natural function of the gravity.

A further—objective of the invention is to decrease occupational accidents, since workforce in the heavy works will be decreased.

Another objective of the invention is to control all processes of the tires stocked by means of automation/PLC system by employing sensors.

Another objective of the invention is to check the storehouse state over a computer through recording all tires in the system by means of scanning.

The structural and the characteristic features and all advantages of the invention will be understood more clearly with the detailed description written by referring to the following figures. Therefore, the evaluation needs to be done by taking these figures and the detailed description into consideration.

DESCRIPTION OF REFERENCES

Figure 1:
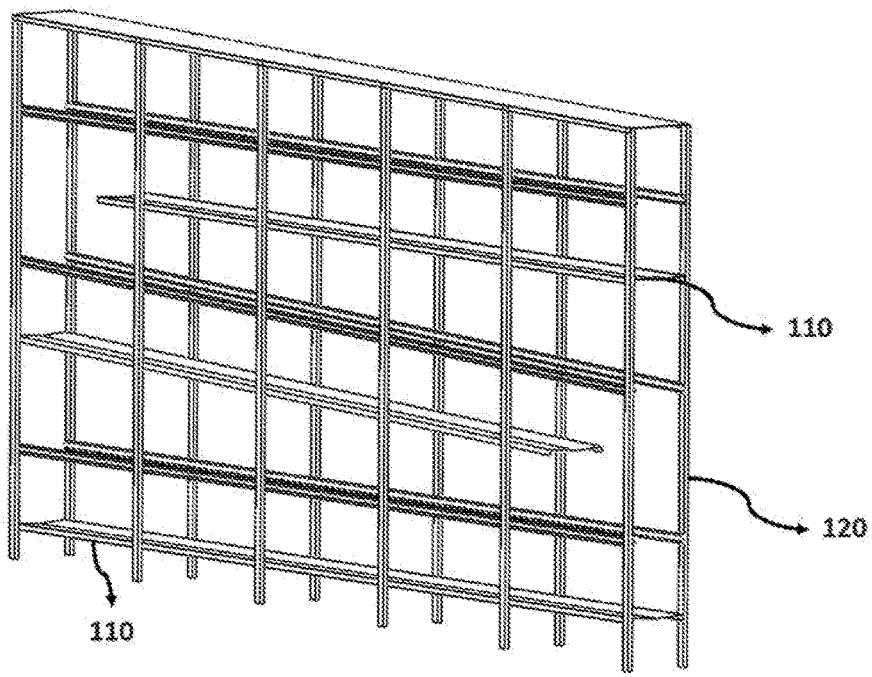
FIG. 1; is a drawing disclosing a perspective view of the tire stocking system subject to the invention.
Figure 2:
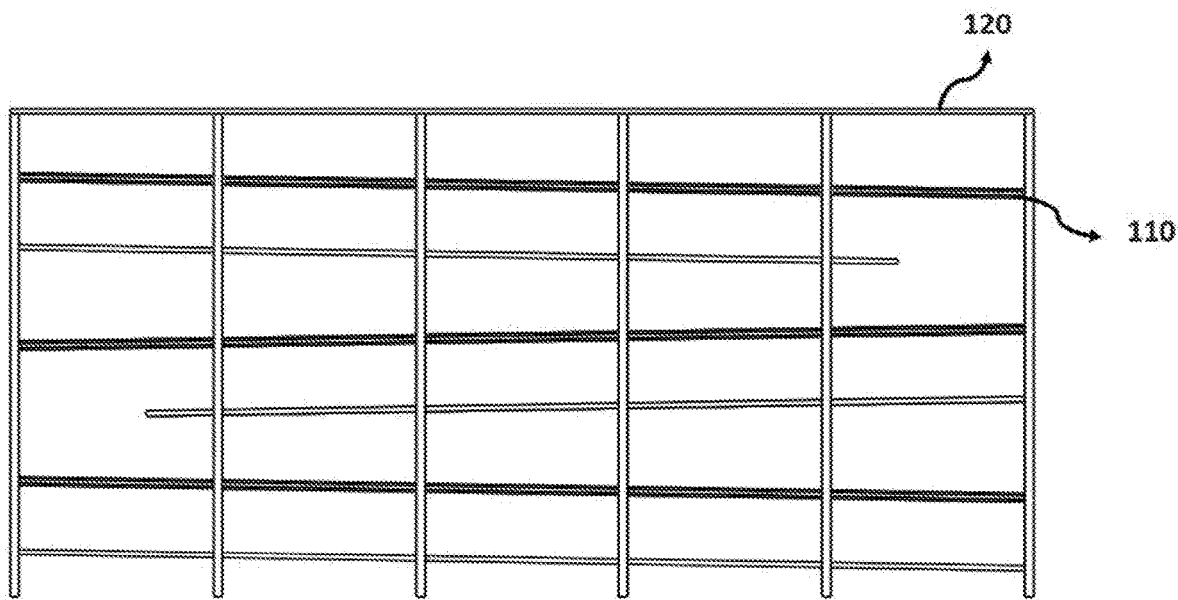
FIG. 2; is a drawing disclosing a frontal view of the tire stocking system subject to the invention.
Figure 3:
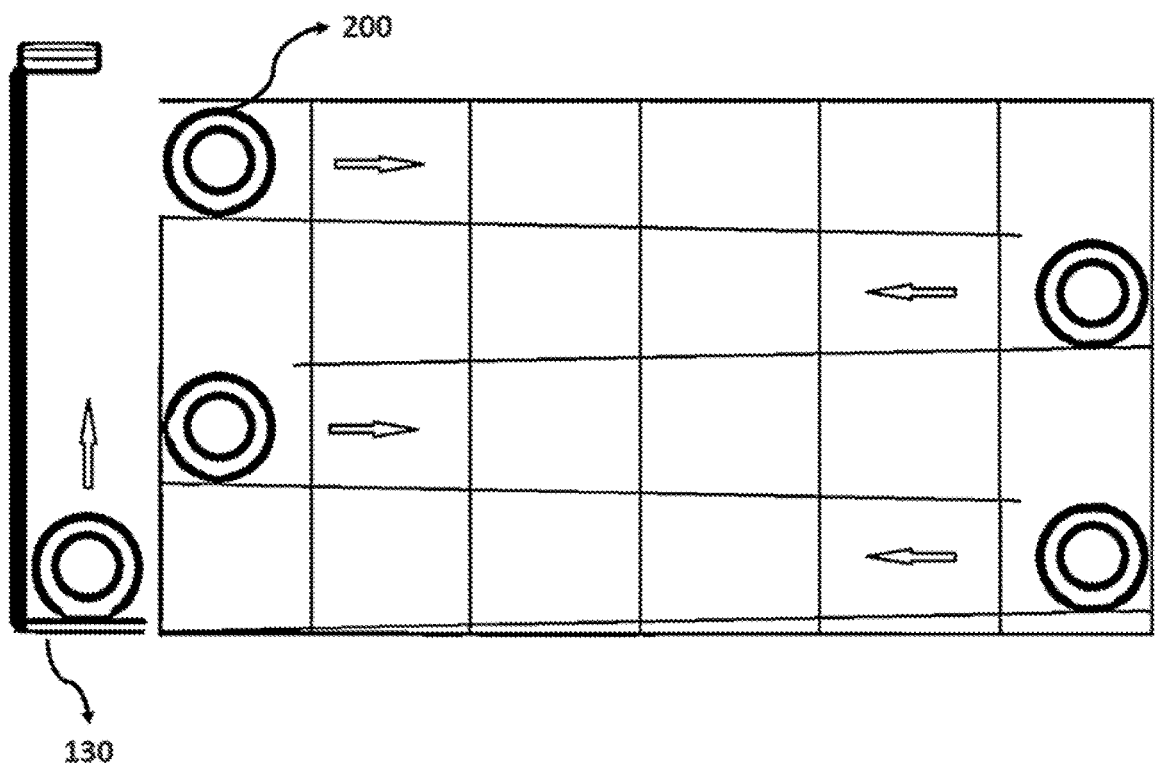
FIG. 3; is a drawing disclosing a tire moving view of the tire stocking system subject to the invention.

100. Tire Stocking System
110. Tire Rack
120. Rack Frame
130. Tire Lift
131. Lift Motor
132. Tire Holder
133. Tire Camera
134. Lift Chain
135. Rack Sensor
200. Tire

DESCRIPTION OF THE INVENTION

The tire stocking system (100) according to the invention comprises one or more tire racks (110) comprising a height that can be used in various kinds of storehouses and can accommodate all tires (200) of different dimensions, and a tire lift (130) that carries the tires (200) to the one or more tire racks (110). Thereby, more car tires (200) can be stocked compared to storehouses in the same sizes.

The tire stocking system (100) subject to the invention is comprised of two main elements. These are the tire rack (110) and the tire lift (130). The tire rack (110) provides movement of the tires (200) through gravity force thanks to its sloped structure and provides that the tire (200) stocked first is removed first (200). The tire lift (130) provides placing the tire (200) of which dimension and diameter are detected by a tire camera (133) at the appropriate tire rack (110) through the information obtained by host computer.

In addition to this, in order to record the input and output of the tire stocking system (100), the tire stocking system (100) comprises the tire camera (133) detecting the dimension and diameter of the tire (200) to be charged into the tire stocking system (100), thereby transmitting to host computer the information pertaining to in which tire rack (110) the tire (200) will be stocked and the rack sensors (135) positioned at the entry and exit of the tire rack (110).

One tire lift (130) is mounted on the side of the tire rack (110) that can be produced out of steel or aluminum. Said tire lift (130) pushes the tire (200) to desired tire rack (110) by reaching the desired height and it is provided that the tire (200) moves through the tire rack (110) by means of gravity force. Stock control of the tire (200) is carried out by building an automatization/PLC system in the time period in which the tire (200) is enter into the tire rack (110) after loaded to the tire lift (130). It is provided that the tire (200) stocked in the first place can be taken out as the first tire (200) to go. Thus, it is avoided that the car tires (200) having useful life time stay disorderly in the storehouse. Depending on the stocking type, it is provided to avoid wearing the tires (200) and human related issues. Within this scope, occupational accidents are decreased and a significant amount of energy can be saved. Furthermore, it is avoided that human related issues may occur in storehouses.

The tire (200) loaded by the user to the tire lift (130) and sent to tire racks (110), can be taken out by the same user from the exit point at the lower floor by moving by means of gravity force through the tire rack (110) in sloped structure. There are by-pass spaces on certain floors for unexpected situations that may occur while tire (200) is moving through tire racks (110) and tires (200) can be taken out from said spaces.

Tire stocking system (100) subject to the invention comprises the following process steps;

Loading at least one tire (200) to tire lift (130) comprising tire holders (132);

Detecting a dimension and diameter of each of the at least one tires with a tire camera (133) on the tire lift (130);

Placing each tire (200) into an appropriate tire rack (110), of one or more tire racks by the tire lift (130);

Transmitting by at least one rack sensor (135) at an entry of the one or more tire racks (110), information on a number of the tires (200) being placed into the tire rack (110);

Moving the one or more tires (200) towards an end of the one or more tire racks (110) a sloped structure of the tire rack (110);

Taking one or more tires (200) reaching the end of the one or more tire racks (110) out of tire stocking system (100); and Transmitting by at least one rack sensor (135) at the exit of the one or more tire racks (110), output information of each of the one or more tires (200) taken out of tire stocking system (100) to host computer.

The rack frame (120) is made out of steel or aluminum in accordance with its capacity and size, and can be constructed with square or rectangle sections. Tire racks (110) can be assembled through joining parts, screwing and welding depending on the material types and profiles. They can be produced both modularly in standard sizes and desired measurements.

There is no production restriction for the height, depth and length of the tire rack (110).

Tire (200) moves towards the end of the tire rack (110) with gravity force from the tire rack (110) of which the slope angle varies between 3° and 11° after being pushed towards to tire rack (110).

Tire (200) can be taken out of the tire stocking system (100) by variously moving through the tire rack (110).

Tire lift (130) carries a tire (200) to the top tire rack (110) in one of the said movement characteristics and tire (200) rolls down to the end of the tire rack (110) so as to drop down to a lower tire rack (110) through space therein and keep moving in the opposite direction. By carrying out those processes in all tire racks (110), it reaches the latest tire rack (110).

Figure 4:
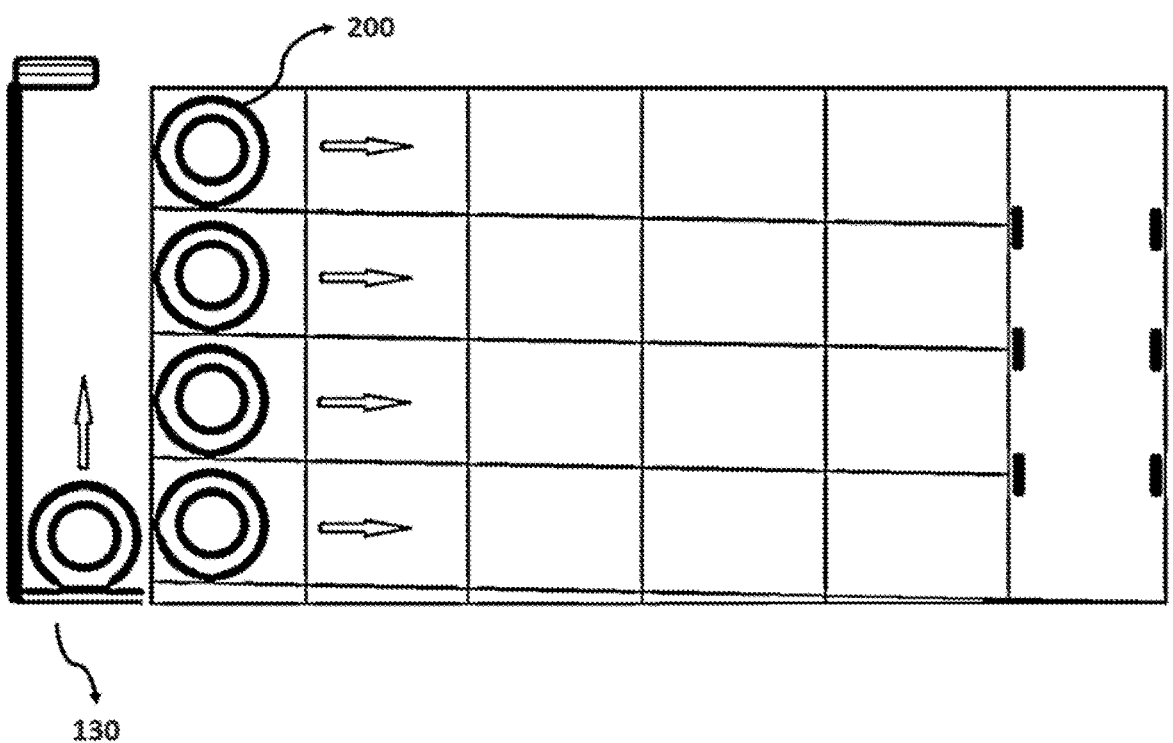
FIG. 4; is a drawing disclosing a alternatively tire moving view of the tire stocking system subject to the invention.
Figure 5:
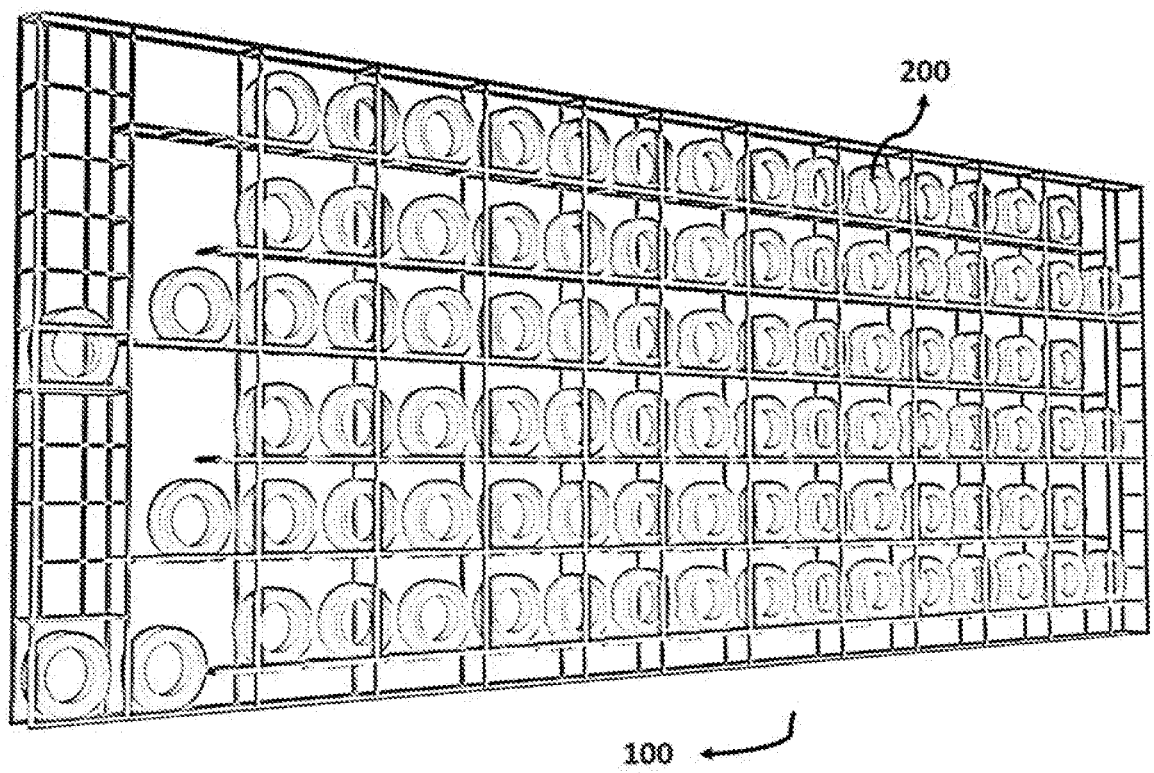
FIG. 5; is a drawing disclosing a view of tire-loaded state of the tire stocking system subject to the invention.
Figure 6:
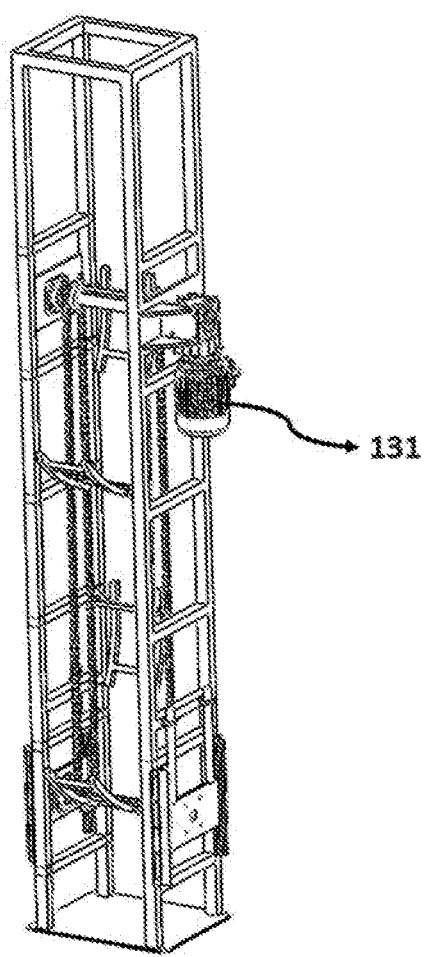
FIG. 6; is a drawing disclosing a perspective view of the tire lift element of the tire stocking system subject to the invention.
Figure 7:
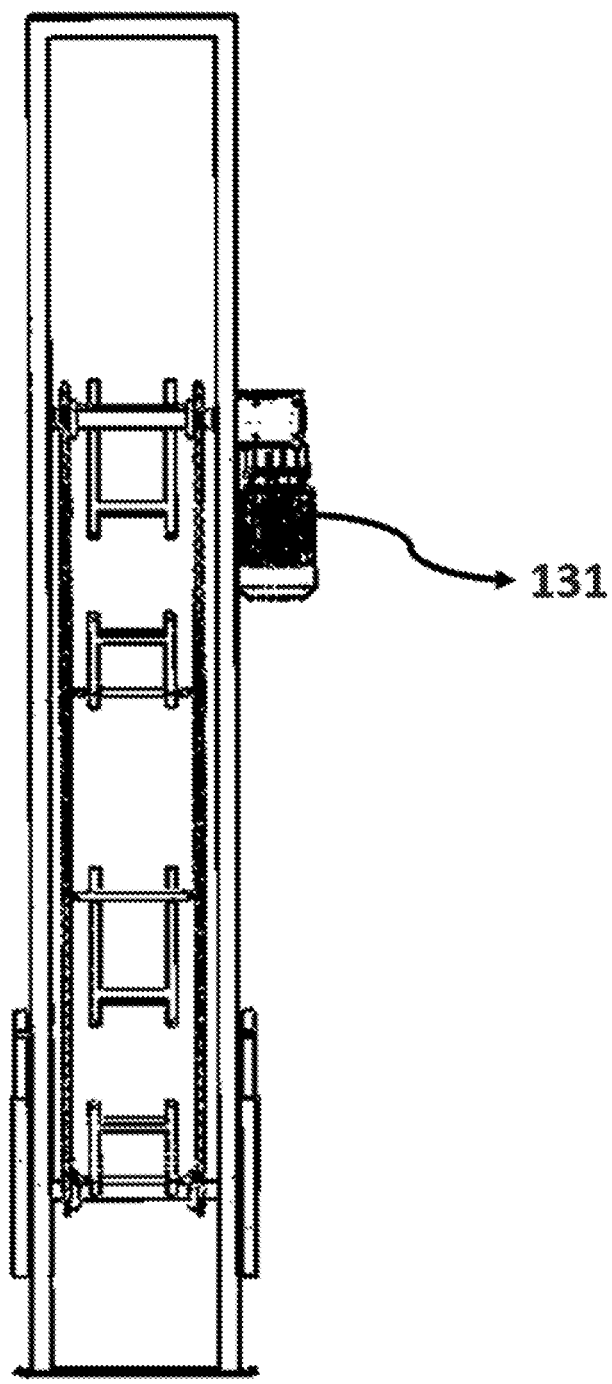
FIG. 7; is a drawing disclosing a frontal view of the tire lift element of the tire stocking system subject to the invention.
Figure 8:
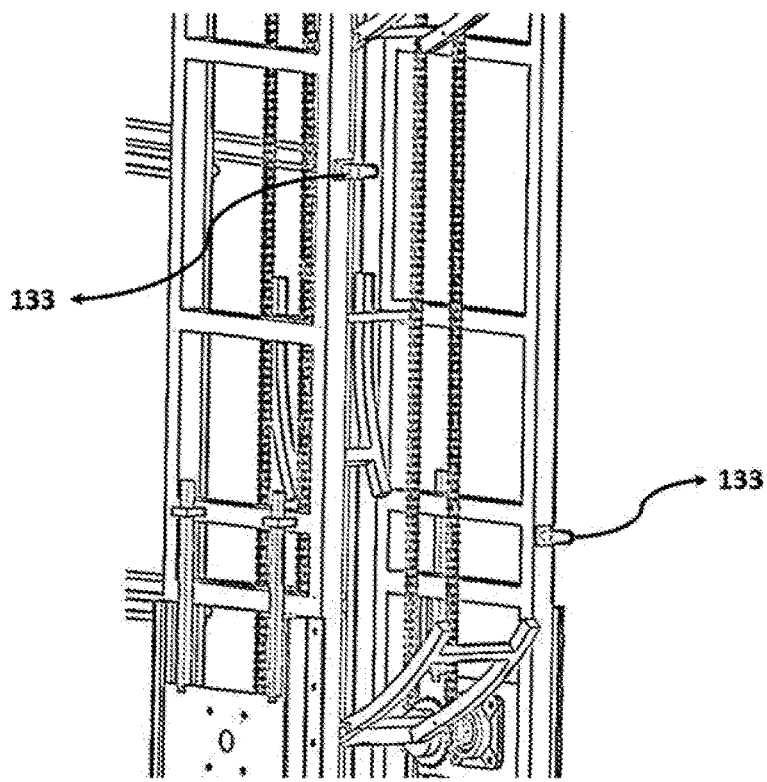
FIG. 8; is a drawing disclosing a view of the tire camera element of the tire stocking system subject to the invention.
Figure 9:
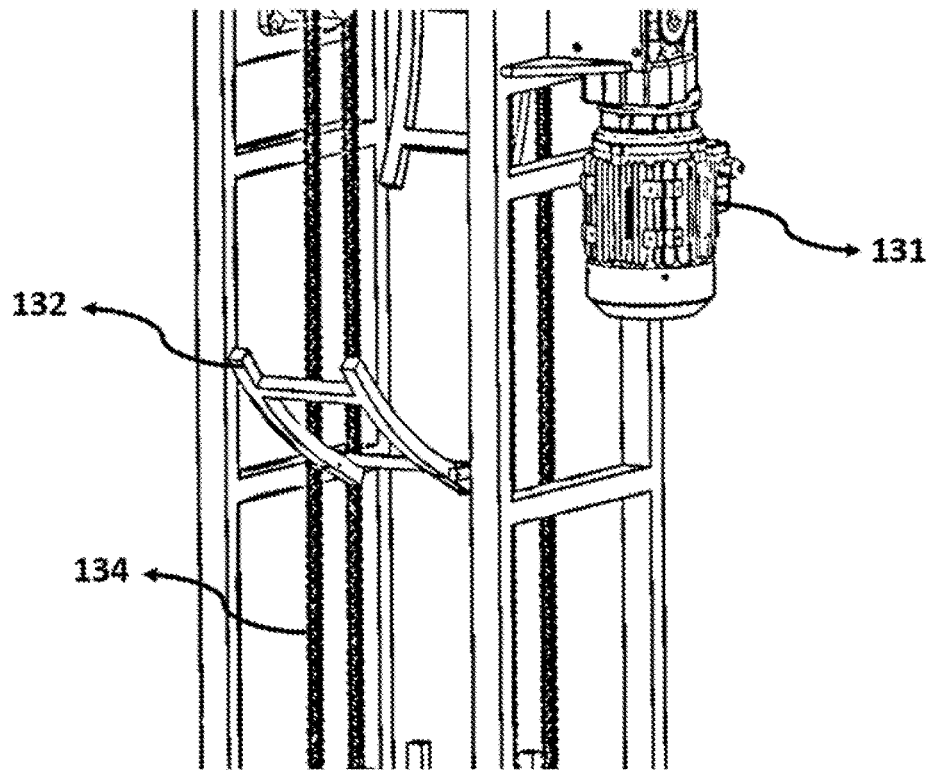
FIG. 9; is a drawing disclosing a detailed sectional view of the tire lift element of the tire stocking system subject to the invention.
Figure 10:
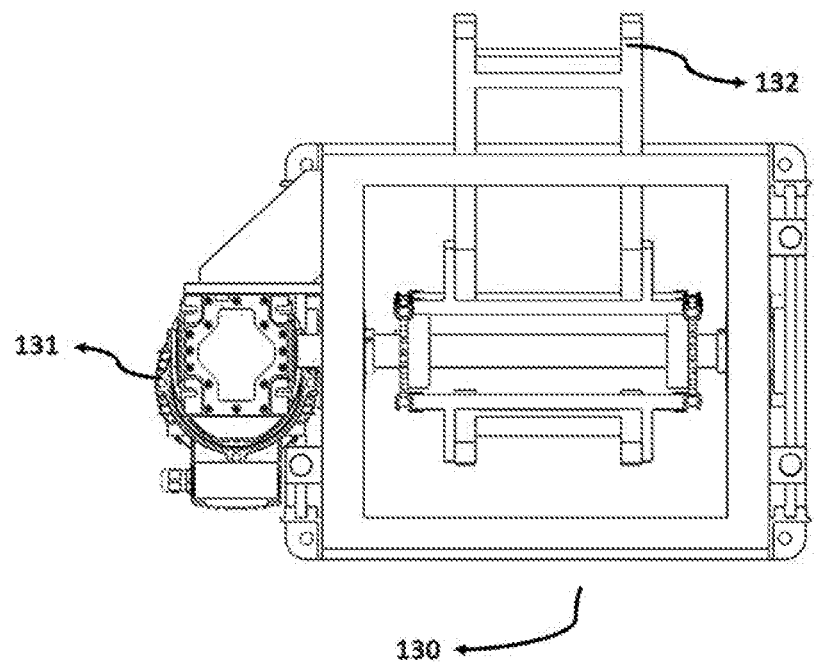
FIG. 10; is a drawing disclosing a upper view of the tire lift element of the tire stocking system subject to the invention.
Figure 11:
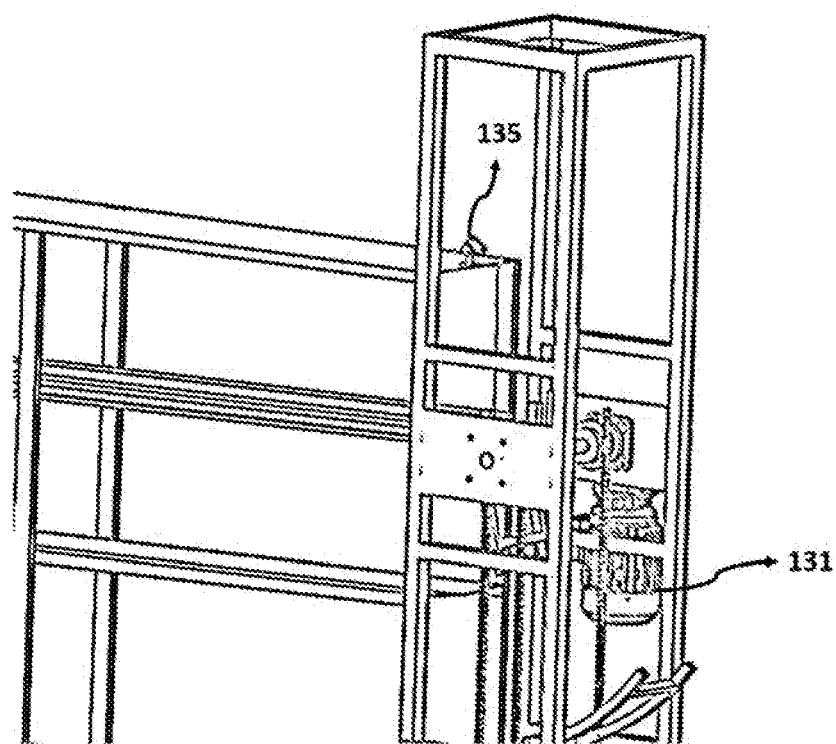
FIG. 11; is a drawing disclosing a view of the upper rack sensor element of the tire stocking system subject to the invention.
Figure 12:
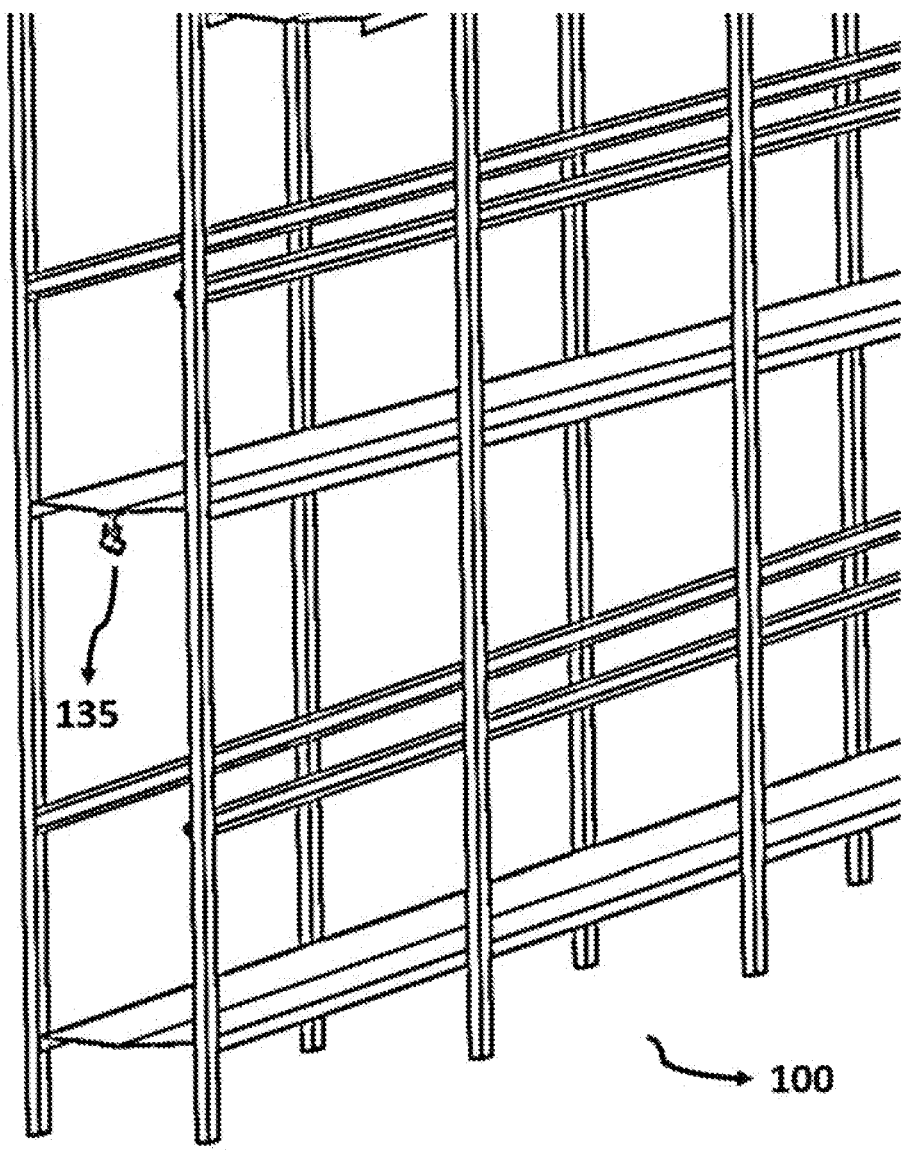
FIG. 12; is a drawing disclosing a view of the lower rack sensor element of the tire stocking system subject to the invention.

In a different movement characteristic, as shown in FIG. 4, tire lift (130) pushes the tire to the rack and tire (200) moves towards the end of the tire rack (110) by means of gravity force. Afterward, it drops down to the point of exit at the bottom from the end of the tire rack (110). There are stoppers on the sides of the tire racks so as to prevent tires (200) from getting damaged. Said stoppers significantly decrease the speed of tires falling down. While there is a bidirectional flow in the first movement characteristic, there is a unidirectional flow in the second movement characteristic. Thus, the tire stocked first, can be taken out first in both movement characteristics.

The tire lift is designed in a such way that it does not put additional weight on the static load of the rack frame (120). The tire lift (130) is produced in a such way that it can be directly mounted to the tire frame (120) depending on the load that it will bear and placing the lift motor (131).

At least 4 sprockets placed on a chassis and an electrical lift motor (131) are mounted such that the tire lift (130) can carry the tire (200). There are tire holders (132) pertinent to tire (200) dimensions on the lift chains (134). Said tire holders (132) take one tire (200) at a time and carry it to upper tire racks (110). It is provided that tire (200) is stocked in the tire rack both through both stop at the desired tire rack (110) and top tire rack (110). When tire lift (130) reaches the top tire rack (110), since tire holders (134) keep up turning, it pushes tire (200) into the tire rack (110) and keeps up turning by swinging. Thus, tire (200) storing goes on continuously.

For detecting tire (200) dimension, when tire (200) is loaded into the system by the user, there is a tire camera (133) on the tire lift (130) so as to find out the tire rack (110) to which tire (200) belongs. Dimension of the tire (200) is detected and transmitted to the host computer by processing the image through said tire camera (133). The tire lift (130) is controlled by mechanical or PLC (Programmable Logic Control) so that the host computer can deliver it to the tire rack (130) to which tire (200) belongs.

In order to detect the remaining number of tires (200), there are rack sensors (135) at the entry and exit of the tire rack (110). Via said rack sensors (135), date and time of tires (200) getting in and out of the tire rack (110) are recorded on the base in the host computer. By means of said information, by carrying out necessary calculations on the host computer, it can be daily, weekly, monthly or yearly monitored that how many tires (220) there are in which tire rack (120). Input and output information on tire (200) also can be monitored via the host computer and/or mobile devices.

The invention claimed is:

1. A tire stocking system (100) for storing tires (200) used in automotive sector, comprising:
   one or more tire racks (110) having a sloped structure for enabling movement of the tires (200) through gravity force, wherein the tires (200) stocked within the tire stocking system (100) can be taken out of the tire stocking system (100),
   a tire camera (133) for detecting dimension and diameter of the tires (200) loaded into the tire stocking system (100), and transmits to a host computer the dimension and diameter information of the loaded tires (200),
   a rack sensor (135) for detecting the number of tires (200) that are loaded into and out of the tire stocking system (100), and for transmitting an entry date and time of the loaded tires (200) and for further transmitting the capacity of the one or more tire racks (110) to the host computer,
   a tire lift (130) for placing the tires (200) at an appropriate tire rack (110) based on the detected dimension and diameter information for each tire (200), wherein the host computer determines the appropriate tire rack (110) based on the detected dimension and diameter information.

2. The tire stocking system (100) according to claim 1, wherein a slope angle of the one or more tire racks (110) is between 3-11°.

3. A method for stocking tires in automotive sector tire storing system, the method comprising the following steps:
   loading at least one tire (200) to a tire lift (130) comprising tire holders (132);
   detecting a dimension and diameter of each of the at least one tire with a tire camera (133) that is on the tire lift (130);
   placing each tire (200) of the at least one tire into an appropriate tire rack (110), of one or more tire racks, by the tire lift (130);
   transmitting by at least one rack sensor (135) at an entry of the one or more tire racks (110), information on a number of the tires (200) being placed into the at least one tire rack (110);
   moving the one or more tires (200) towards an end of the one or more tire racks (110) by a sloped structure of the tire rack (110);
   taking one or more tires (200) reaching the end of the one or more tire racks (110) out of tire stocking system (100); and
   transmitting by at least one rack sensor (135) at an exit of the one or more tire racks (110), output information of each of the one or more tires (200) taken out of tire stocking system (100) to host computer.

* * * * *